United States Patent [19]
Meisinger et al.

[11] Patent Number: 5,915,365
[45] Date of Patent: Jun. 29, 1999

[54] COMBINED SYSTEM USING A VAPOROUS FUEL MIXTURE ENERGY SOURCE AND AN INTERNAL COMBUSTION ENGINE AND METHOD THEREFOR

[75] Inventors: Phil Meisinger, Odessa, Tex.; Gene E. Stinson; Edwin W. Wheeler, both of Las Vegas, Nev.

[73] Assignee: Engine World, Inc.

[21] Appl. No.: 08/840,206

[22] Filed: Apr. 11, 1997

[51] Int. Cl.⁶ .................................................. F02M 21/04
[52] U.S. Cl. .................... 123/527; 123/184.46; 123/525; 123/526
[58] Field of Search ..................................... 123/527, 540, 123/541, 542, 184.46, 184.39, 184.32, 525, 526, 528, 529

[56] References Cited

U.S. PATENT DOCUMENTS

| | | | |
|---|---|---|---|
| 1,974,586 | 9/1934 | Prentiss | 123/540 |
| 3,972,324 | 8/1976 | Marsee | 123/184.39 |
| 4,603,672 | 8/1986 | Keller | 123/540 |
| 5,228,423 | 7/1993 | Oikawa et al. | 123/525 |
| 5,377,645 | 1/1995 | Moore | 123/525 |
| 5,477,830 | 12/1995 | Beck et al. | 123/527 |
| 5,587,467 | 12/1996 | Harnett et al. | 123/527 |
| 5,677,732 | 10/1997 | Wolters et al. | 123/527 |
| 5,713,340 | 2/1998 | Vandenberghe et al. | 123/527 |

FOREIGN PATENT DOCUMENTS

| | | | |
|---|---|---|---|
| 3139229 | 4/1983 | Germany | 123/540 |
| 185258 | 8/1991 | Japan | 123/540 |

*Primary Examiner*—John T. Kwon
*Attorney, Agent, or Firm*—Harry M. Weiss; Jeffrey D. Moy; Harry M. Weiss & Associates, P.C.

[57] ABSTRACT

A combined system and method is shown and described which uses a vaporous fuel mixture energy source comprised of air and a vaporous fuel as a source of fuel for an internal combustion engine. This mixture of air and vaporous fuel is injected into each one of a plurality of cylinders of an internal combustion engine. The air and vaporous fuel mixture is cooled prior to being injected into the internal combustion engine. In another embodiment, an electric generator is coupled to the internal combustion engine.

90 Claims, 5 Drawing Sheets

COMBINED SYSTEM USING A VAPOROUS FUEL MIXTURE ENERGY SOURCE AND AN INTERNAL COMBUSTION ENGINE AND METHOD THEREFOR

FIELD OF THE INVENTION

This invention relates generally to energy sources combined with engines and methods therefor and, more particularly, to an improved combined system including a vaporous fuel mixture energy source and an internal combustion engine and method therefor.

BACKGROUND OF THE PRIOR ART

In the past, various sources of fuel have been used to provide an energy source for, for example, an internal combustion engine. For vehicles, gasoline, diesel fuel and other forms of fuel have been used or developed as an energy source for the internal combustion engine and for similar engines such as the diesel and rotary engines. In some applications, the engines were used to drive a vehicle such as an automobile, truck, van, motor home, etc. while in other applications the engines were used to drive an electric generator that supplied current as a source of electricity to operate, for example, appliances and other types of devices or apparatus needing electricity including air conditioning and electric heating systems, and in other applications the engines were used to operate pumps for agriculture, oil, and other industries.

The cost of the fuel used as an energy source was and is constantly a major consideration in the systems that were used or needed to provide electrical energy, power to drive pumps or power to operate vehicles.

Liquid fuel sources such as gasoline and oil were expensive and/or not reliable as a long term source of energy due to OPEC oil price changes and/or per country oil output limits artificially created by OPEC to create worldwide oil shortages and resulting in increased oil prices for the members of OPEC.

Accordingly, business establishments such as retail malls and other commercial and even non-commercial facilities or units required, for as low a cost as practical, reliable energy sources to drive internal combustion type engines (including even diesel engines), or for powering electric generators used to produce (low cost) electricity, or to operate pumps.

An energy source that is both reliable as a source of energy because of the relative abundance thereof and, because of this relative abundance, relatively low in cost is a vaporous fuel source such as natural gas, propane gas, methane gas, butane gas or any other vaporous fuel or blend thereof. However, in the past, it has been exceedingly difficult to effectively use such a vaporous fuel source for an internal combustion engine. For example, one problem in using a vaporous fuel source as part of a system for generating electricity using an internal combustion engine, was to obtain an efficient mixture of air and the selected vaporous fuel. Another problem was to obtain a very efficient way to deliver the mixture of air and the selected vaporous fuel to the desired portion of the internal combustion engine. A further problem was to find a very efficient conduit or conduits to carry the mixture of air and the selected vaporous fuel which would have optimum length to diameter characteristics to obtain the desired flow of the mixture into the internal combustion engine. A still further problem was to develop and use the mixture of air and the selected vaporous fuel and/or the two components of this mixture at a temperature that enhances the use of this mixture in an internal combustion engine. Still another problem was to find a way to achieve maximum acceleration of the mixture of air and the selected vaporous fuel into the internal combustion engine. Another further problem was to find a way to introduce air (that is to be used for the mixture) substantially turbulent free and in a linear direction for optimum flow and to enhance mixture with a vaporous fuel. Still another problem was to find an optimum way to exhaust out the exhaust gases exiting from the internal combustion engine, cool the exhaust gases for safety reasons or efficiency reasons and to reduce noise generated by the exhaust gases. A still further problem was to generate electricity from a combined system using a vaporous fuel mixture energy source and an internal combustion engine and also to efficiently use the electricity as generated. Still another problem was to find an efficient way to exhaust the unburned fuel and air from a spark ignited internal combustion engine that uses a vaporous fuel. The problem was to find a "tuned" exhaust design that would provide optimum combustion of the fuel and air in the combustion chamber, balance the exhaust flow rate to match the engine requirements, match the exhaust flow rate from each cylinder as closely as possible to each other cylinder in an engine with a plurality of cylinders, reduce the exhaust temperature by creating a greater percentage fuel burn in the combustion chamber and a smaller percentage fuel burn in the exhaust system, and to create a quieter exhaust by restricting the exhaust flow to match the engine requirement.

Still another problem was to find a way to increase the useful life of the internal combustion engine that is using a vaporous fuel mixture.

Therefore, a need existed to provide a combined system and method including a vaporous fuel mixture energy source and an internal combustion engine alone or in combination with an electric generator that would overcome or solve all of the above identified problems.

SUMMARY OF THE INVENTION

Accordingly, it is an object of this invention to provide an improved combined system and method which includes a vaporous fuel mixture energy source and an internal combustion engine.

It is another object of this invention to provide an improved combined system and method which includes a vaporous fuel mixture energy source, an internal combustion engine and an electric generator coupled to the internal combustion engine.

It is a further object of this invention to provide a combined system and method which includes a vaporous fuel mixture energy source and an internal combustion engine wherein an efficient mixture of air and a selected vaporous fuel is supplied to the internal combustion engine.

It is still another object of this invention to provide a combined system and method which includes a vaporous fuel mixture energy source and an internal combustion engine wherein the vaporous fuel mixture is optimumly delivered to the internal combustion engine.

It is a still further object of this invention to provide a combined system and method which includes a vaporous fuel mixture energy source and an internal combustion engine which includes substantially equivalent conduits preferably having optimum length to diameter characteristics for carrying a desired flow of the vaporous fuel mixture energy source into the internal combustion engine.

It is another object of this invention to provide a combined system and method which includes a vaporous fuel mixture energy source and an internal combustion engine, wherein a mixture of air and a selected vaporous fuel and/or each of these two components of this mixture is cooled, to enhance the use of this mixture in the internal combustion engine.

It is still another object of this invention to provide a combined system and method which includes a vaporous fuel mixture energy source and an internal combustion engine wherein acceleration of the vaporous fuel mixture energy source into the internal combustion engine is achieved.

It is a further object of this invention to provide a combined system and method which includes a vaporous fuel mixture energy source and an internal combustion engine wherein air as a component of the vaporous fuel mixture energy source is introduced into the mixture substantially turbulent free and in a linear direction for both optimum flow and to increase the acceleration of the air and/or air/fuel mixture for optimum use by the engine.

Still another object of this invention is to provide a combined system and method which includes a vaporous fuel mixture energy source and an internal combustion engine wherein exhaust gases exiting from the internal combustion engine are cooled and the noise generated by the relatively hot exhaust gases is substantially reduced.

It is another object of this invention to provide a combined "tuned" exhaust system that has an exhaust header system sized in the diameter of its exhaust tubes to match the exhaust flow requirements of the spark ignited, internal combustion engine operating on a vaporous fuel. The sizing of the diameter of the header tubes to match the exhaust flow requirements of the engine operating at a fixed engine RPM, causes a greater portion of the fuel to be burned in the combustion chamber and a smaller portion of the fuel to be burned in the exhaust system. In a spark ignited, internal combustion engine operating on a vaporous fuel, the exhaust header tubes must be small enough to restrict exhaust flow rates to match the engine requirements and will in some instances require tube diameter sizes smaller than the diameter of the exhaust ports of the engine. This achieves lowering exhaust temperatures by up to 100 degrees F. and delivers greater engine horsepower and torque on less fuel, by minimizing unburned fuel flowing through the exhaust system by increasing the amount of the vaporous fuel mixture burned in the engine.

It is still another object of this invention to provide a combined "tuned" exhaust system that has exhaust header tubes of lengths, bends, and angles, designed to create nearly equal exhaust flow rates from each cylinder in an engine with a plurality of cylinders. This assists in balancing the performance and efficiency of each cylinder in comparison to each other cylinder in an engine with a plurality of cylinders. With each cylinder delivering nearly equal amounts of power, the total power output and efficiency of the engine is improved.

Still another object of this invention is to reduce the noise level of the engine exhaust by restricting the exhaust flow rate to only that required by the spark ignited, internal combustion engine operating on a vaporous fuel, and operating at a fixed engine RPM. This combined exhaust system substantially lowers the level of the engine exhaust noise. The engine exhaust noise is further reduced by flowing the exhaust through a low restriction, circular flow, Cowl type exhaust silencer.

A still further object of this invention is to provide an improved combined system and method which includes a vaporous fuel mixture energy source, an internal combustion engine, and an electric generator coupled to the internal combustion engine whereby electricity is generated and to use a portion of the generated electricity in a feedback loop to operate various components of the system.

A still further object of this invention is to provide a system and method which produces efficient engine power while operating the engine cooler and at a slower engine speed in order to reduce friction and heat and thereby increase the engine's performance and useful life.

BRIEF DESCRIPTION OF THE PREFERRED EMBODIMENTS

In accordance with one embodiment of this invention, a combined system is disclosed including a vaporous fuel mixture energy source and an internal combustion engine which comprises, in combination, an internal combustion engine having a plurality of cylinders; and a vaporous fuel mixture energy source coupled to the internal combustion engine. The vaporous fuel mixture energy source comprises means for injecting a mixture of air and vaporous fuel into each one of the plurality of cylinders to provide a source of fuel for each one of the plurality of cylinders.

In accordance with another embodiment of this invention, a combined system is disclosed including a vaporous fuel mixture energy source and an internal combustion engine which comprises, in combination, an internal combustion engine having a plurality of cylinders; a vaporous fuel mixture energy source comprising a mixture of air and vaporous fuel coupled to the plurality of cylinders of the internal combustion engine, and cooling means for cooling the air and the vaporous fuel prior to mixture and entry into the plurality of cylinders of the internal combustion engine.

In accordance with still another embodiment of this invention, a method of providing an energy efficient combined system is disclosed including a vaporous fuel mixture energy source and an internal combustion engine which comprises the steps of providing an internal combustion engine having a plurality of cylinders; and injecting a vaporous fuel mixture energy source into the internal combustion engine. The vaporous fuel mixture energy source comprising means for injecting a mixture of air and vaporous fuel into each one of the plurality of cylinders to provide a source of fuel for each one of the plurality of cylinders.

In accordance with a further embodiment of this invention, a method of providing an energy efficient combined system is disclosed including a vaporous fuel mixture energy source and an internal combustion engine which comprises the steps of providing an internal combustion engine having a plurality of cylinders; injecting a vaporous fuel mixture energy source comprising a mixture of air and vaporous fuel into the plurality of cylinders of the internal combustion engine; and providing cooling means for cooling the air and the vaporous fuel prior to mixture and entry into the plurality of cylinders of the internal combustion engine.

The foregoing and other objects, features and advantages of this invention will be apparent from the following more particular description of the preferred embodiments of the invention as illustrated in the accompanying drawings.

DESCRIPTION OF THE EMBODIMENTS

Figure 1:
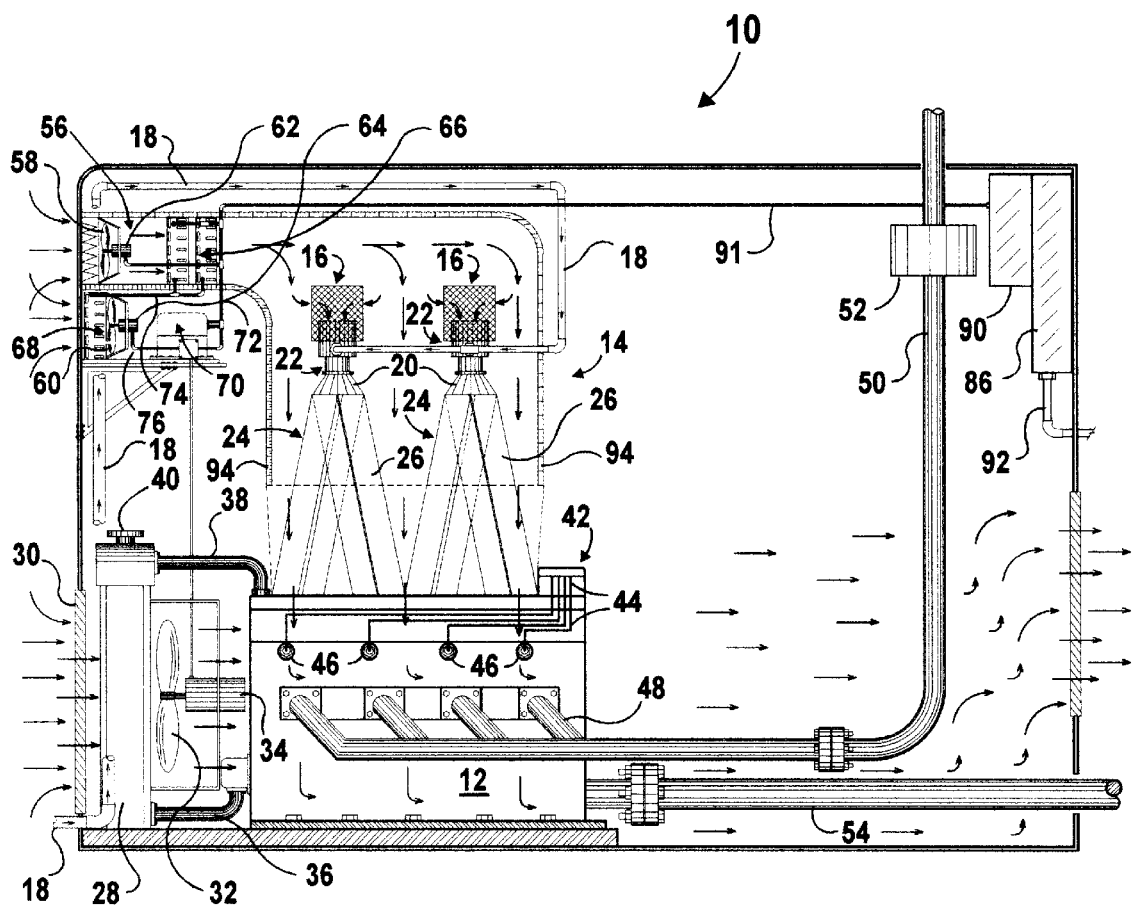
FIG. 1 is a side elevational view of a combined system which includes a vaporous fuel energy source, a source of air for mixture with the vaporous fuel energy source, a pair of carburetors for mixing the air with the vaporous fuel energy source to provide a mixture thereof, a cooling system to cool the air and fuel before the air and fuel is mixed in the carburetors, an internal combustion engine coupled to the pair of carburetors to receive the mixture of air and the vaporous fuel energy source, and an exhaust system for exhausting out the exhaust gases generated by the internal combustion engine.

Referring to FIG. 1, reference number 10 generally refers to a combined system of this invention which includes an internal combustion engine 12 and a vaporous fuel mixture energy source generally designated by reference number 14 that is used to provide vaporous fuel for the internal combustion engine 12. The internal combustion engine 12 can be any suitable type of internal combustion engine using, for example, a two cylinder, four cylinder, six cylinder, eight cylinder, ten cylinder, twelve cylinder, etc. type internal combustion engine. If desired any spark ignited internal combustion engine can be used. Thus, the term internal combustion engine as used herein is intended to cover all of these types of engines and variations thereof that have already been created or that may be created in the future.

Figure 2:
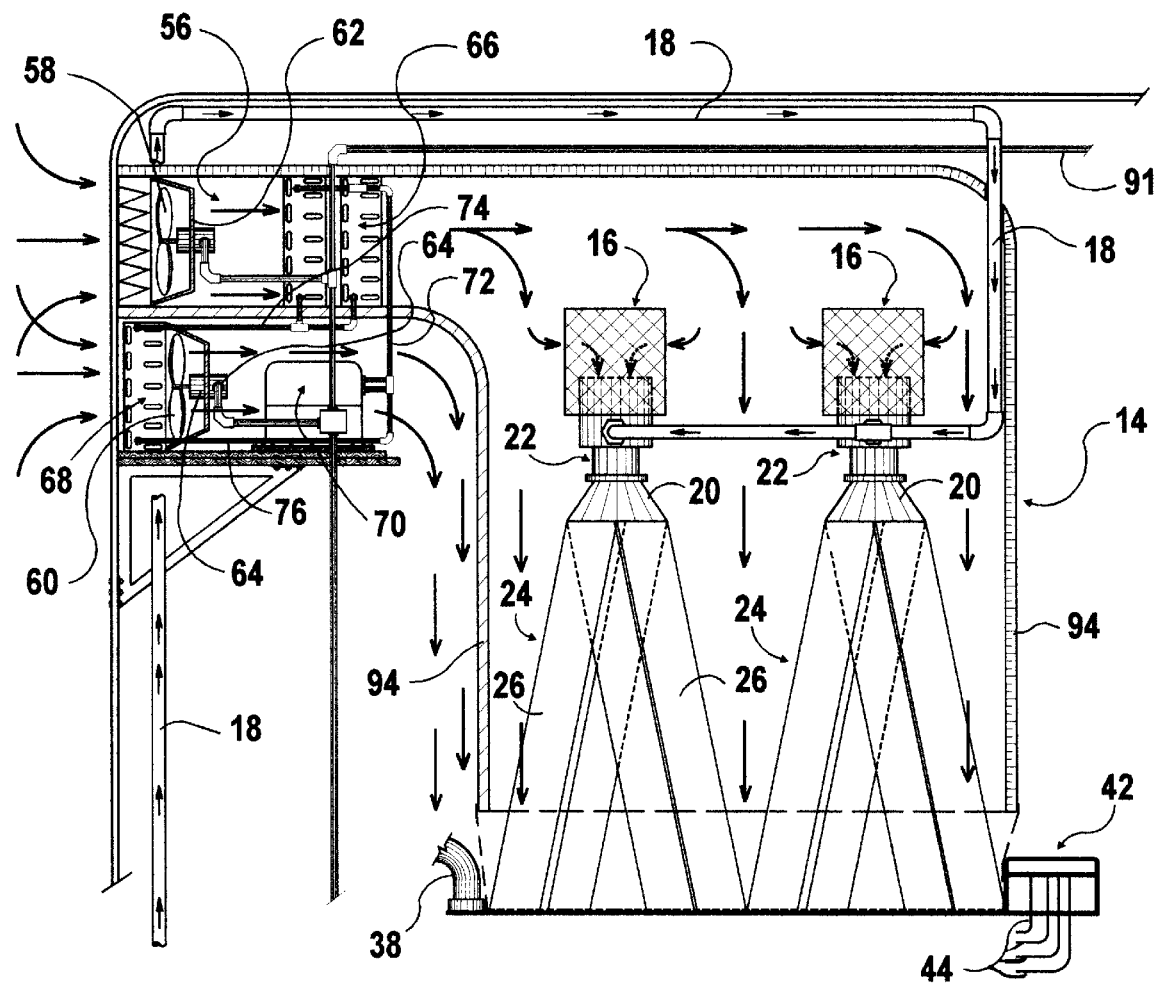
FIG. 2 is an enlarged side elevational view of a portion of the combined system of FIG. 1 depicting the pair of carburetors, a cooling system for cooling air that is introduced into the pair of carburetors, and a plurality of conduits for carrying the mixture of air and the vaporous fuel energy source into the internal combustion engine (not shown in FIG. 2, but shown in FIG. 1).

Referring to FIGS. 1 and 2, the vaporous fuel mixture energy source 14 is comprised of, in the embodiment of FIGS. 1 and 2, a pair of carburetors 16 that are used for receiving air at a top end portion thereof for mixing with a vaporous fuel that is introduced into each one of the pair of carburetors 16 at another end portion thereof by means of a vaporous fuel line 18 that is connected to an external source (not shown) of the vaporous fuel. The term vaporous fuel as used herein is intended to cover all presently known types of vaporous (as distinguished from either liquid or solid fuel) fuel such as natural gas, propane, butane, methane, etc. and/or mixtures of two or more fuel energy gases as well as future vaporous fuels and/or mixtures of such vaporous fuels. Presently, natural gas is the preferred source of vaporous fuel to be used with this invention because of the low cost thereof relative to other presently known sources of vaporous fuel, however, methane gas and possibly other man made or natural vaporous gas mediums. The vaporous fuel mixture energy source 14 is further comprised of a plenum type chamber 20 that is located at a bottom portion of a pair of vaporous fuel receiving member means 22 (which are each coupled to a lower end of the respective carburetor 16) so that the mixture of air and the vaporous fuel located in each plenum type chamber 20 can be coupled and delivered to the internal combustion engine 12. Coupled to each plenum chamber 20 for the purpose of carrying the mixture of air and vaporous fuel to the internal combustion engine 12 are means 24 for accelerating and injecting the mixture of air and vaporous fuel preferably into each one of a plurality of cylinders located in the internal combustion engine 12. Preferably, each one of a plurality of conduits 26 (preferably one for each cylinder of the internal combustion engine 12) provide the means 24 for accelerating and injecting the mixture of air and vaporous fuel into each cylinder of the internal combustion engine 12. In the embodiment depicted in FIGS. 1, 2, 4 and 5, the internal combustion engine 12 is preferably an eight cylinder engine and, therefore, there are four conduits 26 associated with each one of the pair of carburetors 16 and, thus, each one of the total of eight conduits 26 is directly connected to its associated cylinder in the internal combustion engine 12. Each of the eight conduits 26 depicted in the embodiments of FIGS. 1, 2, 4 and 5 preferably are equal in length and diameter to provide equal or the same amounts of the mixture of air and vaporous fuel to each of the cylinders of the internal combustion engine 12. Optimum dimensions for each of these conduits 26 is a length to diameter ratio of about 8 to about 1 to about 12 to about 1. Preferably, about 10 to about 1 is most optimum. Accordingly, for example, the conduits 26 can each be about 20 inches long and each has a width or diameter of about 2 inches. Changes in these dimensions can be varied, if desired, for different applications and for different needed flow characteristics.

Figure 4:
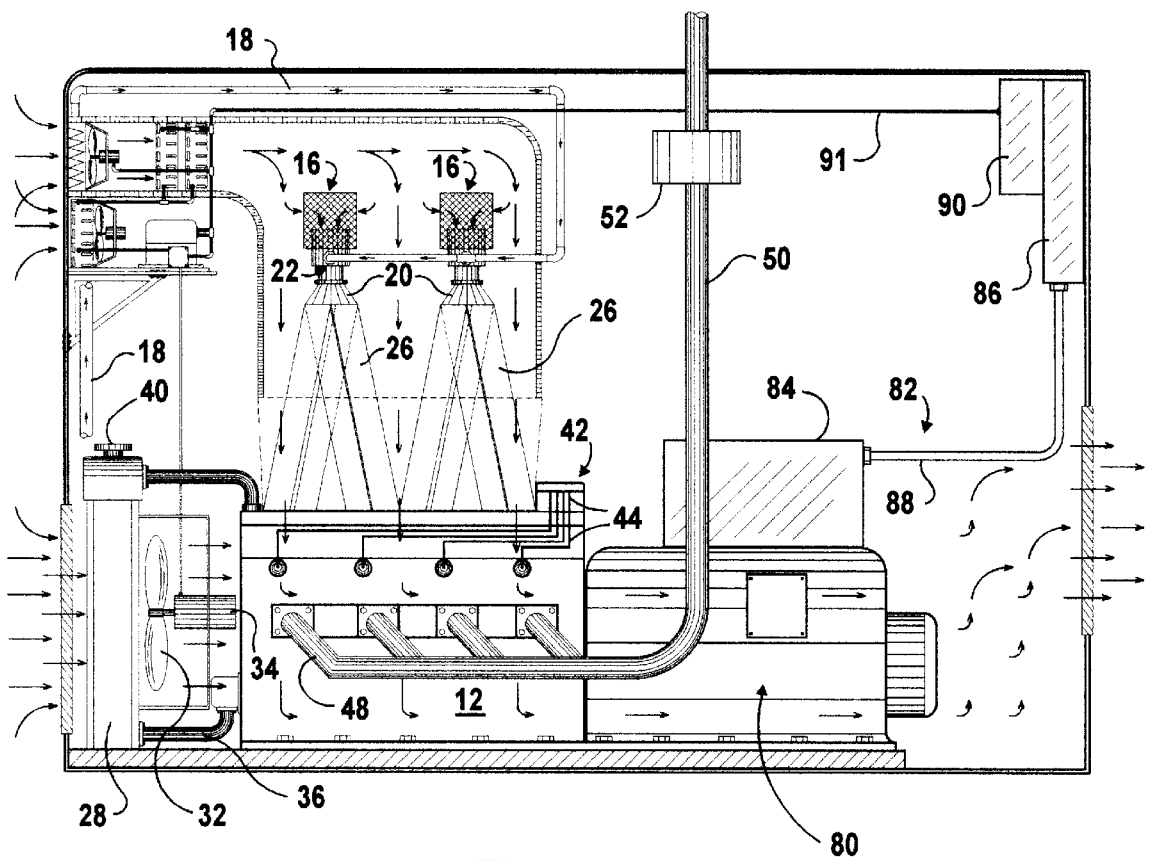
FIG. 4 is a side elevational view similar to the side elevational view of FIG. 1 with the addition to the combination shown in FIG. 1 of an electric generator coupled to the internal combustion engine and a feedback loop for connecting at least a portion of the electric output of the electric generator for the purpose of powering certain components of the cooling system shown in FIGS. 1, 2 and 3.

The internal combustion engine 12 also comprises a radiator 28 that contains a coolant fluid such as water or any one of the known coolants used for radiators for vehicles or for internal combustion engines. Air entering the system 10 through a grill 30 (as shown by the arrows passing through the grill 30) serves to help cool the radiator 28 along with fan 32 located behind the radiator 28. The fan 32 is driven by electric motor 34 which is powered (as described hereafter by an electric generator not shown in FIG. 1). If the internal combustion engine 12 is operated without the attachment to the generator 80 which is shown in FIG. 4 then the electric motor for the fan 32 can be operated by the alternator (not shown) attached to the internal combustion engine 12. The coolant fluid of the radiator 28 circulates into and out of the internal combustion engine 12 for the cooling thereof by means of conduits 36 and 38. Radiator cap 40 provides a means for adding or replacing coolant fluid for the radiator 28, as needed.

The internal combustion engine 12 also comprises a distributor and distributor cap of assembly 42 which serves to provide an electric spark to each of the cylinders of the internal combustion engine 12 by means of distributor wires 44 connected to spark plugs 46 (only 4 of the 8 spark plugs 46 are shown in FIG. 1) which provide the electric spark to each of the cylinders of the internal combustion engine 12. The distributor assembly 42 can be powered by an electric battery (not shown) or alternator (not shown) by electricity provided by an electric generator (not shown in FIG. 1, but shown in FIG. 4).

As depicted in FIG. 1, the system 10 is substantially enclosed to provide temperature control within the interior portion of the substantially enclosed system 10. Desirably the temperature within the substantially enclosed system 10 is lower or, if desired, higher, than the temperature outside of the substantially enclosed system 10. Thus, for example, exhaust conduits 48 (four of the eight exhaust conduits are shown in FIG. 1) provide a means for permitting exhaust gases generated within each of the cylinders of the internal combustion engine 12 to be exhausted or removed therefrom. Preferably, a single exhaust pipe 50 is associated with the four exhaust conduits 48 (the other exhaust pipe for the other four exhaust conduits is not shown because it is located on the opposite side of the internal combustion engine 12) which serves to exhaust to an area outside of the system 10 exhaust gases from the internal combustion engine 12. Since there are four exhaust conduits 48 on each side of the internal combustion engine 12, a balanced or tuned exhaust is achieved which permits the internal combustion engine 12 to run cooler and allows each cylinder to be subjected to a back pressure that is more equal to every other cylinder in the internal combustion engine 12 thereby providing a more efficient engine operation. Since the exhaust conduits 48 and the exhaust pipe 50 are located within the lower temperature region of the substantially enclosed system 10 (which is preferably kept much cooler than the temperature outside of the substantially enclosed system 10 as described below), the efficiency of the internal combustion engine 12 is increased and there is added safety since the exhaust gases have significantly reduced temperature. Thus, a combined "tuned" exhaust system is provided that has an exhaust header system sized in the diameter of its exhaust tubes 48 to match the exhaust flow requirements of the spark ignited, internal combustion engine 12 operating on a vaporous fuel. The sizing of the diameter of the header tubes 48 to match the exhaust flow requirements of the engine 12 operating at a fixed engine RPM, causes a greater portion of the fuel to be burned in the engine. In the spark ignited, internal combustion engine 12 operating on a vaporous fuel, the exhaust header tubes 48 must be small enough to restrict exhaust flow rates to match the engine 12 requirements and will in some instances require tube diameter sizes smaller than the diameter of the exhaust ports (not shown) of the engine 12. This achieves lowering exhaust temperatures by up to 100 F. and delivers greater engine horsepower and torque on less fuel, by minimizing unburned fuel flowing through the exhaust system by increasing the amount of the vaporous fuel mixture burned in the engine 12. Accordingly, the disclosed combined "tuned" exhaust system has exhaust header tubes 48 of lengths, bends, and angles, designed to create nearly equal exhaust flow rates from each cylinder in the engine 12 with a plurality of cylinders. This assists in balancing the performance and efficiency of each cylinder in comparison to each other cylinder in the engine 12 which has a plurality of cylinders. With each cylinder delivering nearly equal amounts of power, the total power output and efficiency of the engine 12 is improved. The noise level of the engine exhaust is reduced by restricting the exhaust flow rate to only that required by the spark ignited, internal combustion engine 12 operating on a vaporous fuel, and operating at a fixed engine RPM. This combined exhaust system substantially lowers the level of the engine exhaust noise. The engine exhaust noise is further reduced by flowing the exhaust through a low restriction, circular flow, Cowl type exhaust silencer. Furthermore, the exhaust pipe 50 exits the system 10 at a much safer location above the system 10 thereby avoiding a much more dangerous exhaust gas exit condition if the exhaust gases exited laterally out of the system 10. For the purpose of further reducing noise associated with exhaust gases that exit out of the internal combustion engine 12, a noise muffler or silencer means 52 (such as a COWL silencer) is coupled to the exhaust pipe 50. Thus, the noise is reduced to preferably about 60 decibels. The internal combustion engine 12 also comprises a drive shaft 54 that is used for providing a driving means for any desired application such as a drive shaft for a vehicle or to drive an electric generator shown in FIG. 4.

One specific example of an internal combustion engine 12 that can be used as shown in the system 10 of FIG. 1 is a 7.4 liter V8 engine as made by GM. While two carburetors 16 are shown in FIG. 1, one carburetor can be used for a 2 cylinder type engine, 1 or 2 carburetors can be used for a 4 cylinder type engine, 3 carburetors can be used for a 6 cylinder type engine as well as a 10 and 12 cylinder type engine while 2 carburetors 16 (as shown in FIG. 1) are preferably used for an 8 cylinder type engine. The system 10 of FIG. 1 has an efficiency of up to about 45% which is significantly higher than the approximately 25% efficiency of liquid fuel type internal combustion engines. Furthermore, the system 10 of FIG. 1 provides an up to 50% reduction in cost of operation over presently existing natural gas internal combustion engines. Since natural gas has an octane rating of about 125 as compared to an average octane rating of about 80 for gasoline, the use of natural gas, for example, in the system 10 of FIG. 1 provides a very efficient system. The system 10 of FIG. 1 can be used in the field or in urban or remote locations and provides power for pumps and/or generates electricity. Since natural gas is a much cleaner (higher octane) fuel, the internal combustion engine 12 can run much longer and more efficiently. Vaporous fuels such as natural gas and the other vaporous fuels noted above are more efficient and can burn easier. Presently, the cost of (higher octane) natural gas is approximately the equivalent of 50 cents per gallon as compared to the much higher cost (over 1 dollar) associated with (lower octane) gasoline.

While the system 10 of FIG. 1 is shown using the pair of carburetors or carburetor means 16, the system 10 can be designed to use fuel injection techniques to directly inject a mixture of air and vaporous fuel into each of the cylinders of the internal combustion engine 12. Thus, fuel injectors can be used in place of the carburetors 16.

With regard to FIGS. 1, 2, 3 and 4, air cooling means generally designated by reference number 56 is used to cool air entering the system 10 as shown by the arrows external to the system 10 at the upper left portion of the system 10 as shown. An air filter is located in front of fan 58 to filter air entering the system 10. The fans 58 and 60 are respectively powered by electric motors 62 and 64 which are electrically connected to an electric control panel that is part of an electric generator system as described below with reference to FIG. 4. Behind the fan motor 62 is preferably two sets of cooling coils 66 which are used to cool the air entering the system 10 adjacent to the fan 58. Thus, air passing through the first of the two sets of cooling coils 66 is preferably cooled about 22 degrees Fahrenheit below the temperature of the air entering the system 10. The second of the two sets of cooling coils 66 preferably cools the air that has passed through the first of the two sets of cooling coils 66 another 22 degrees Fahrenheit thereby substantially cooling the air that has entered the system 10. Preferably, Freon is used to pass through the two sets of cooling coils 66 to thereby serve as the cooling medium therefor. A condenser 68 shown in front of the fan 60 is used in combination with a compressor 70 located behind the motor 64 to provide the Freon cooling medium to the two sets of cooling coils 66. Thus Freon is supplied to an input portion of each of the two sets of cooling coils 66 from the compressor 70 by the conduit 72 and the output portion of each of the two sets of cooling coils 66 is connected by conduit 74 to an input portion of the condenser 68. The output portion of the condenser 68 is connected by conduit 76 to an input portion of the compressor 70 with the output portion of the compressor 70 supplying Freon through the conduit 72 to the two sets of cooling coils 66. While two sets of cooling coils 66 are shown, more than or less than two sets of cooling coils can be used, if desired.

Thus, cooled air is created within the system 10 to be mixed in the carburetors 16 with the vaporous fuel. This cooled air is introduced into the top portions of each of the carburetors 16 in a substantially turbulent free and linear direction which greatly enhances the acceleration of the mixture of this cooled, substantially turbulent free, linearly directed air with the vaporous fuel within the carburetors 16 and also provides greater compaction of the final mixture of air and the selected vaporous fuel. This greater compaction of this mixture provides a higher density of the mixture which provides more fuel efficiency and resulting much greater internal combustion engine performance and efficiency. As can be seen with reference to FIGS. 1, 3, and 4, the conduits or pipes 26 are also cooled because the cooled air passes around these pipes or conduits 26 as shown by the arrows. Because of the cooled air passing around the plenum chamber means 20 and the conduits 26, the mixture of air and vaporous fuel within the conduits 26 is also cooled prior to entry into the cylinders of the internal combustion engine 12. Also, the vaporous fuel entering into the vaporous fuel receiving means 22 is also cooled by the cooled air surrounding the vaporous fuel receiving means 22.

Accordingly, a significant acceleration of the cooled mixture in the conduits 26 into their respective cylinders of the internal combustion engine 12 is achieved because of a differential pressure that is created between a substantially vacuum type environment within each of the cylinders of the internal combustion engine 12 that acts to rapidly accelerate or suck into each of the cylinders the compressed (low temperature) mixture of air and the vaporous fuel thereby greatly enhancing the performance and efficiency of the internal combustion engine 12. Preferably, a ratio mixture of about 10 (air) to about 1 to about 20 (air) to about 1 (vaporous fuel) has been found to provide excellent results for the mixture of air and vaporous fuel for the system 10.

The operational characteristics of certain important features of the system 10 are set forth below.

When a large displacement of gas is forced through a relatively small opening or tube such as the mixture of air and the vaporous fuel by either pressure or vacuum, the gas accelerates in relation to the displacement, the size and length of the opening or tube, and the pressure or vacuum.

Therefore, in an internal combustion engine designed with intake valves to allow for the entry of fuel and air, any increase in velocity of the entry of fuel and air, any increase in velocity of the air/fuel into the intake port when the intake valve is open, increases the volume of fuel and air into the combustion chamber during each combustion cycle of the engine. This increase of fuel and air means that more energy and more oxygen is available in each combustion cycle of the engine. More available energy creates more horsepower and torque output from the engine, without increasing the engine displacement.

The density of the air and fuel (the air and vaporous fuel mixture) are directly related to their temperature. A greater air/fuel density is desirable in an internal combustion engine, because the molecules of air and fuel will be closer together to provide more energy in a smaller displacement than in a less dense air/fuel comparison. Therefore, lower temperature environments for air and fuel create a greater density of the air and fuel.

Furthermore, still or stabilized gas (the air and vaporous fuel mixture) can be pressured or drawn by vacuum from a large displacement through a relatively small opening or tube more efficiently than can disturbed or unstable gas. Greater efficiency of passage of the gas through the opening or tube creates greater acceleration and greater velocity for the gas when it reaches the destination end of the opening or acceleration tube or conduit 26.

The acceleration tubes or conduits 26 create acceleration of the mixture and they increase the velocity of the flow of the mixture to the plenum intake manifold or engine intake valve port (not shown). This creates a positive pressurization or "boost", increasing the amount of air and vaporous fuel for each combustion cycle of the engine thereby increasing the power output and efficiency of the engine. The "boost" design is not parasitic to the power output of the engine. This "boost" is created without the use of moving parts. Moving parts create design complications, friction caused by heat, greater cost, and shorter engine life.

The acceleration tubes 26 are ideally designed with straight walls, with a height or length about 8 to about 1 to about 12 to about 1 times the diameter, in order to produce optimum acceleration and "boost". The acceleration tubes 26 attach to an intake manifold, plenum or directly to the intake valve ports of the internal combustion engine 12 at the bottom of the tubes 26.

The acceleration tubes 26 are shown located within, in effect, an air stabilizing chamber. Stable air creates a greater efficiency of acceleration and velocity of the air or air vaporous fuel mixture in the acceleration tubes 26. The size of the air stabilizing chamber should be sized to the air vaporous fuel intake requirements of the engine. The ideal size of the air stabilizing chamber should be between 20 and 40 times the cubic inch displacement of the engine.

The air stabilizing chamber should preferably be insulated from the radiant heat of the engine. This makes the cooler air vaporous fuel mixture more dense, which increases the molecules of air, fuel and energy in each combustion cycle. This increased energy creates more power output from the engine without increasing the engine size.

The air or air/fuel stabilizing chamber is insulated from the radiant heat of the engine. The same insulation will keep the interior cooler, as artificial cooling is introduced into the stabilizing chamber.

Cooling of the air and/or the mixture of air and vaporous fuel can be achieved either by refrigeration means as shown in FIGS. 1, 2, 3 and 4 and/or by evaporative coolers. Either cooling process should be accompanied by a fan of sufficient size to satisfy the engine displacement requirements with an adequate cooled air or air vaporous fuel mixture. For example, if a 500 cubic inch engine is operating at 2000 RPM, then the cubic inch gas displacement requirement per minute of the engine is 500 times 2000 divided by 8 divided by 2 for a V/8 engine design.

The artificial cooling system is ideally designed to drop the ambient air temperature by a minimum of 30 degrees with a sufficient air or air vaporous fuel flow to satisfy the displacement size and RPM of the engine.

Under certain conditions, another design of artificial cooling is to utilize refrigeration and evaporative systems in combination in order to supply a sufficient volume of cooled air and air vaporous fuel.

In a properly designed, vaporous fuel, stationary engine as disclosed herein, as much as a 20 percent increase in horsepower and torque of about 1800 RPM can be achieved by cooling the environment for the air or air vaporous fuel from about 100 degrees F. to about 70 degrees F. or lower, if desired.

The power to run the evaporative and/or refrigeration system (shown in FIGS. 1, 2, 3 and 4) and the associated fan or fans is obtained from the electric generator shown in FIG. 4.

The cooled air or air vaporous fuel mixture utilized by the internal combustion engine 12 allows for the engine 12 to utilize a higher compression ratio in the combustion chamber without encountering preignition. Preignition causes power loss and damage to the engine parts that come into contact with the combustion chamber. Higher compression ratios produce greater utilization of the available energy in each combustion cycle. This creates improved engine power and efficiency without increasing the engine displacement. The cooler air and/or air vaporous fuel mixture creates cooler combustion temperatures of up to 100 degrees centigrade. Cooler combustion temperatures create fewer harmful exhaust emissions of nitrous oxides. Also, cooler combustion temperatures create less friction caused by heat. Less friction creates greater engine power and efficiency as well as longer engine life. The insulated, air filtered, cooled, air and air vaporous fuel stabilizing chamber provides for better cooled air filtration than is available in conventional air filters for internal combustion engines. This creates longer engine life by suppressing the entry of engine contaminants.

The cooling system 56 is preferably thermostat controlled to provide for the desired temperature in the stabilizing chamber regardless of the ambient air temperature.

The "tuned" exhaust header system of FIG. 1 which includes the exhaust conduits 48 and the exhaust pipe 50 balances the exhaust restriction load on the engine to allow for cooler operation and longer engine life.

Consequently, the cooperative utilization of all of the above noted features of the system 10 causes the optimum improvement in engine power output and efficiency. This causes the engine 10 to deliver greater power output at a lower engine RPM. Greater power output at a lower engine operating RPM causes the engine to use less fuel (the mixture of air and vaporous fuel) to deliver a given amount of power output. Lower engine operating RPM, delivering the desired power output produces fuel savings because of fewer engine combustion cycles and lower friction coefficients caused by lower engine temperatures. Fewer engine combustion cycles and lower friction coefficients caused by lower engine operating temperatures cause longer engine life. Also, lower engine operating RPM causes quieter engine operation. Furthermore, lower engine operating temperatures and lower fuel use causes the engine 12 to exhaust fewer harmful exhaust emissions.

Referring to FIG. 2, this enlarged view of a portion of the system 10 of FIG. 1 provides greater clarity of the cooling means 56, carburetors 16, etc.

Figure 3:
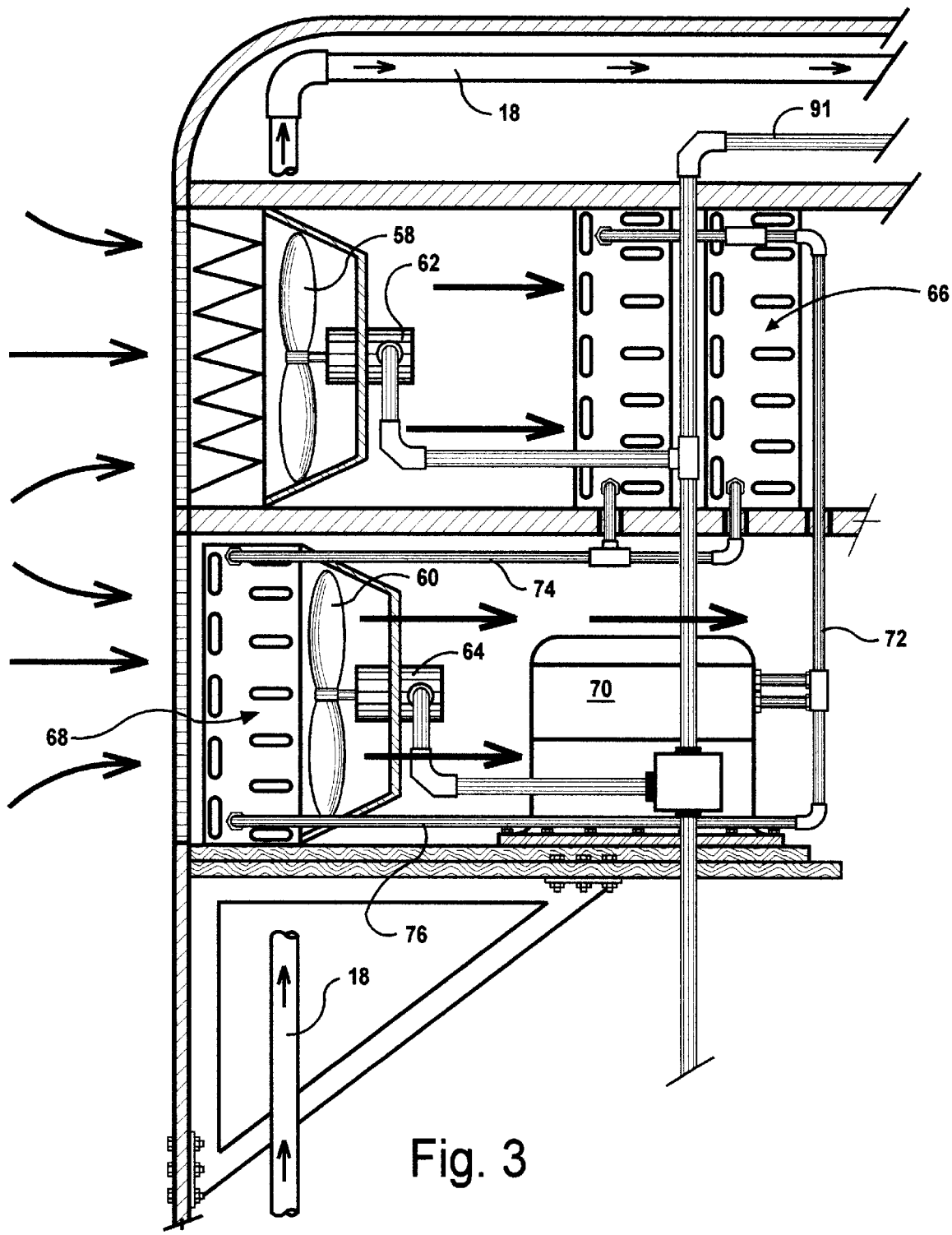
FIG. 3 is an enlarged side elevational view of a portion of the combined system of FIG. 1 and a portion of the combination of elements shown in FIG. 2 depicting the cooling system shown in FIGS. 1 and 2.

Referring to FIG. 3., this is a further enlarged view of the cooling means 56 shown in the system 10 of FIG. 1 and depicted in FIG. 2 to provide greater clarity.

The embodiment depicted in FIG. 4 shows how the internal combustion engine 12 is used to drive an electric generator 80 that is coupled to the drive shaft (or engine fly wheel) (not shown in FIG. 4, but shown in FIG. 1) of the internal combustion engine 12. The electric generator 80 of FIG. 4 provides electricity by means of a feedback loop 82 that comprises an electrical output box 84 that couples at least a portion of the electric output of the electric generator 80 to a control panel 86 by means of an electrical conduit 88. A transformer 90 is electrically connected to the control panel 86 to reduce, for example, the output voltage of 480 volts (60 cycles) generated by the electric generator 80 supplied to the control panel 86 to 110 to 120 volts (60 cycles) in order to provide electricity via conduit 91 to the motors 34, 62 and 64 respectively. Thus, this feedback loop 82 serves to take a relatively small portion of the electricity (i.e. about 500 w to about 1,000 w) of the total amount of electricity (i.e. about 100,000 w) generated by the electric generator 80. The major portion of the electricity generated by the electric generator 80 is externally delivered by a conduit (not shown) coupled to the electric generator 80 so that this electric output can be used as desired. In the embodiment of FIG. 1, since there is no electric generator in this embodiment, electricity is supplied to the control panel 86 from an external electric source (not shown) by means of conduit 92.

Referring to FIG. 1, cooled air located within wall 94 outside of the conduits 26 permeates thereto at a bottom portion thereof through a filter or perforated wall portion (not shown) to provide a coolant fluid medium for the exhaust conduits 48 and the exhaust pipe 50. The above described acceleration within the conduits 26 of the mixture of air and vaporous fuel is believed to receive up to a 3 pound "boost" because of the differential pressure that has been created by the internal combustion engine 12 pulling the mixture of air and vaporous fuel into the tubes 26.

Figure 5:
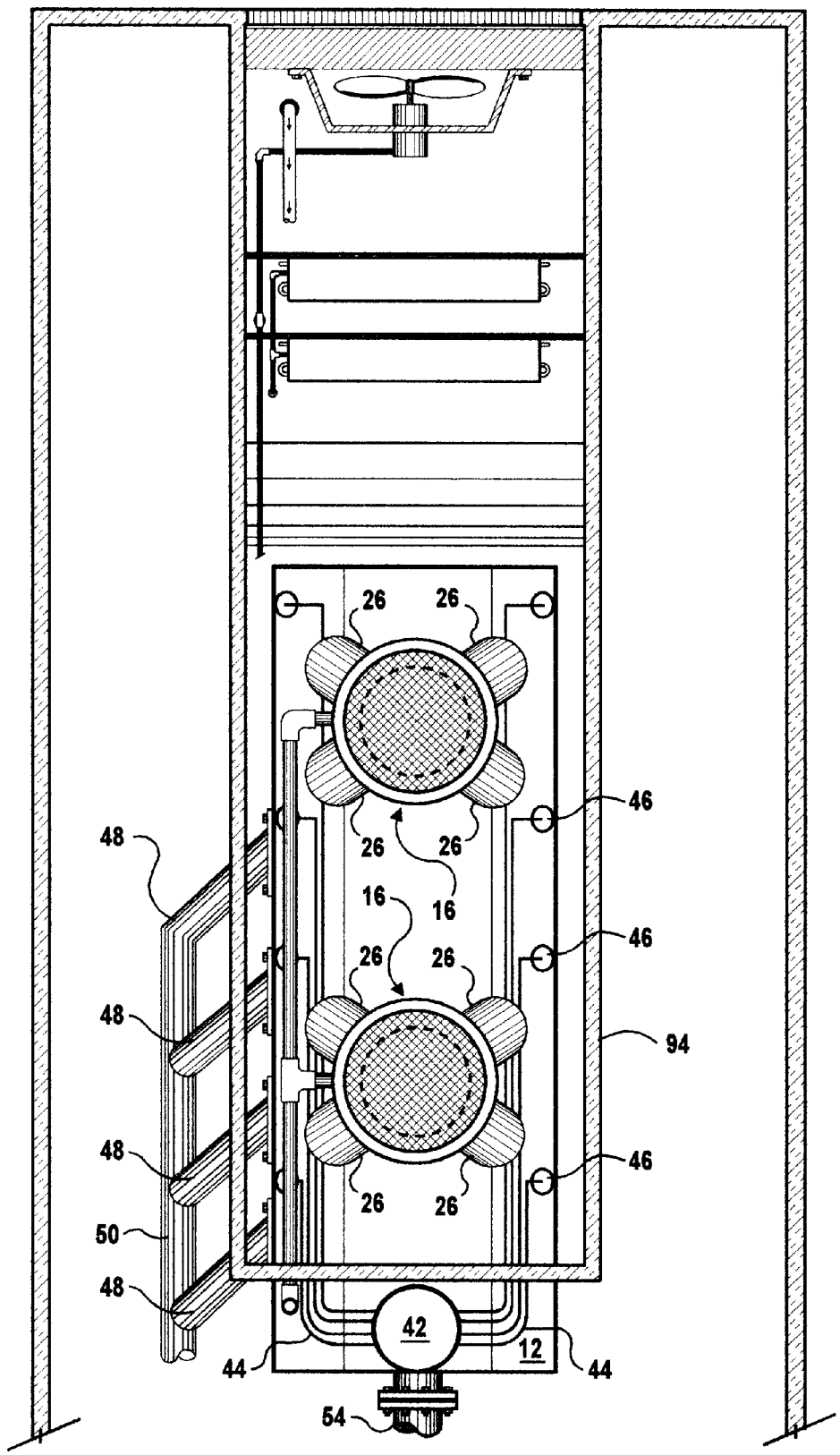
FIG. 5 is a top elevational view of a portion of the combined system depicted in FIG. 1.

Referring to FIG. 5, this is a top view showing various of the elements of FIG. 1 in order to provide a better understanding of the interrelationship between the various elements and the relative locations thereof.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A combined system including a vaporous fuel mixture energy source and an internal combustion engine comprising, in combination:
   an internal combustion engine having a plurality of cylinders;
   a vaporous fuel mixture energy source coupled to said internal combustion engine, said vaporous fuel mixture energy source comprising means for injecting a mixture of air and vaporous fuel into each one of said plurality of cylinders to provide a source of fuel for said each one of said plurality of cylinders; and
   refrigeration means for cooling both said air and said vaporous fuel to a lower temperature to permit increased performance and efficiency of said internal combustion engine.

2. The system of claim 1 wherein said vaporous fuel being at least one of natural gas, propane, butane, methane, and any other vaporous fuel.

3. The system of claim 1 wherein said vaporous fuel mixture energy source consisting of air and natural gas.

4. The system of claim 1 wherein said vaporous fuel mixture energy source consisting of air and propane.

5. The system of claim 1 wherein said vaporous fuel mixture energy source consisting of air and butane.

6. The system of claim 1 wherein said injecting means comprising a plurality of tubes corresponding on a one for one basis with said plurality of cylinders.

7. The system of claim 6 including means for injecting a mixture of air and vaporous fuel into each one of said plurality of tubes.

8. The system of claim 7 wherein said mixture of air and vaporous fuel having a ratio mixture in the range of about 10 to about 20 for air to about 1 for vaporous fuel.

9. The system of claim 6 wherein each one of said plurality of tubes having a length to diameter ratio in the range of about 8 to about 12 to about 1.

10. The system of claim 7 wherein each one of said plurality of tubes having a length to diameter ratio in the range of about 8 to about 12 to about 1.

11. The system of claim 8 wherein each one of said plurality of tubes having a length to diameter ratio in the range of about 8 to about 12 to about 1.

12. The system of claim 6 wherein said plurality of cylinders being eight cylinders and said plurality of tubes being eight tubes.

13. The system of claim 6 wherein said injecting means comprising at least one carburetor means for receiving air in one end thereof; vaporous fuel receiving means coupled to said carburetor means at another end thereof for receiving vaporous fuel for mixture with the air from said carburetor means, and plenum chamber means for coupling and delivering said mixture of air and vaporous fuel received from said vaporous fuel receiving means into each one of said plurality of tubes.

14. The system of claim 13 wherein said injecting means comprising two carburetor means for receiving air in one end of each one thereof, said vaporous fuel receiving means being coupled to each one of said two carburetor means at said another end thereof, said plenum chamber means being coupled to an output of said vaporous fuel receiving means.

15. The system of claim 1 including means for cooling said air prior to injection into each one of said plurality of cylinders.

16. The system of claim 1 including means for cooling said vaporous fuel prior to injection into each one of said plurality of cylinders.

17. The system of claim 1 wherein said cooling means cooling said air and said vaporous fuel prior to injection into each one of said plurality of cylinders.

18. The system of claim 1 including acceleration means for significantly accelerating said mixture of air and vaporous fuel into said each one of said plurality of cylinders.

19. The system of claim 18 wherein said acceleration means located within said each one of said plurality of cylinders for rapidly accelerating said mixture of air and vaporous fuel into said each one of said plurality of cylinders.

20. The system of claim 13 wherein said air received by said carburetor means being substantially turbulent free and in a linear direction.

21. The system of claim 1 including exhaust means connected to said internal combustion engine for exhausting exhaust vapor from said internal combustion engine.

22. The system of claim 21 wherein said exhaust means comprising a plurality of external exhaust conduits located on said internal combustion engine and at least one exhaust pipe connected to said plurality of external exhaust conduits, each one of said plurality of external exhaust conduits having means including a diameter sized to match the exhaust flow of said engine for increasing engine horsepower and torque, lowering exhaust temperatures, increasing the amount of said vaporous fuel mixture burned in said engine and improving fuel economy.

23. The system of claim 22 wherein said exhaust pipe is located in a cooled region of said system to cool said exhaust vapor.

24. The system of claim 22 wherein said exhaust means comprising a pair of exhaust pipes with each one of said pair of exhaust pipes respectively connected to a separate plurality of exhaust conduits.

25. The system of claim 23 including silencer means located in said cooled region of said system and connected to said exhaust pipe for significantly silencing noise generated by said exhaust vapor.

26. The system of claim 1 including generator means coupled to said internal combustion engine for generating electricity.

27. The system of claim 15 wherein said cooling means comprising a fan and cooling coils located within said system adjacent to an air input into said system.

28. The system of claim 27 wherein said cooling means further comprising fan, condenser and compressor means for providing a coolant fluid for said cooling coils.

29. The system of claim 28 including generator means coupled to said internal combustion engine for generating electricity.

30. The system of claim 29 further including feedback means coupled to said generator means for providing electrical energy to power electrical components of said cooling means.

31. A combined system including a vaporous fuel mixture energy source and an internal combustion engine comprising, in combination:
   an internal combustion engine having a plurality of cylinders;
   a vaporous fuel mixture energy source comprising a mixture of air and vaporous fuel coupled to said plurality of cylinders of said internal combustion engine; and
   cooling means including refrigeration means for cooling said air and said vaporous fuel to a lower temperature prior to mixture and entry into said plurality of cylinders of said internal combustion engine to permit increased performance and efficiency of said internal combustion engine.

32. The system of claim 31 including means for injecting said mixture of air and vaporous fuel into each one of said plurality of cylinders to provide a source of fuel for said each one of said plurality of cylinders.

33. The system of claim 31 wherein said vaporous fuel being methane.

34. The system of claim 31 wherein said vaporous fuel being at least one of natural gas, propane and butane.

35. The system of claim 31 wherein said vaporous fuel mixture energy source consisting of air and natural gas.

36. The system of claim 31 wherein said vaporous fuel mixture energy source consisting of air and propane.

37. The system of claim 31 wherein said vaporous fuel mixture energy source consisting of air and butane.

38. The system of claim 32 wherein said injecting means comprising a plurality of tubes corresponding on a one for one basis with said plurality of cylinders.

39. The system of claim 38 including means for injecting a mixture of air and vaporous fuel into each one of said plurality of tubes.

40. The system of claim 39 wherein said mixture of air and vaporous fuel having a ratio mixture in the range of about 10 to about 20 for air to about 1 for vaporous fuel.

41. The system of claim 38 wherein each one of said plurality of tubes having a length to diameter ratio in the range of about 8 to about 12 to about 1.

42. The system of claim 39 wherein each one of said plurality of tubes having a length to diameter ratio in the range of about 8 to about 12 to about 1.

43. The system of claim 40 wherein each one of said plurality of tubes having a length to diameter ratio in the range of about 8 to about 12 to about 1.

44. The system of claim 38 wherein said plurality of cylinders being eight cylinders and said plurality of tubes being eight tubes.

45. The system of claim 38 wherein said injecting means comprising at least one carburetor means for receiving air in one end thereof; vaporous fuel receiving means coupled to said carburetor means at another end thereof for receiving vaporous fuel for mixture with the air from said carburetor means, and plenum chamber means for coupling and delivering said mixture of air and vaporous fuel received from said vaporous fuel receiving means into each one of said plurality of tubes.

46. The system of claim 45 wherein said injecting means comprising two carburetor means for receiving air in one end of each one thereof said vaporous fuel receiving means being coupled to each one of said two carburetor means at said another end thereof, said plenum chamber means being coupled to an output of said vaporous fuel receiving means.

47. The system of claim 31 including acceleration means for significantly accelerating said mixture of air and vaporous fuel into said each one of said plurality of cylinders.

48. The system of claim 47 wherein said acceleration means located within said each one of said plurality of cylinders for rapidly accelerating said mixture of air and vaporous fuel into said each of one of said plurality of cylinders.

49. The system of claim 45 wherein said air received by said carburetor means being substantially turbulent free and in a linear direction.

50. The system of claim 31 including exhaust means connected to said internal combustion engine for exhausting exhaust vapor from said internal combustion engine.

51. The system of claim 50 wherein said exhaust means comprising a plurality of external exhaust conduits located on said internal combustion engine and at least one exhaust pipe connected to said plurality of external exhaust conduits.

52. The system of claim 51 wherein said exhaust pipe is located in a cooled region of said system to cool said exhaust vapor.

53. The system of claim 51 wherein said exhaust means comprising a pair of exhaust pipes with each one of said pair of exhaust pipes respectively connected to a separate plurality of exhaust conduits.

54. The system of claim 52 including silencer means located in said cooled region of said system and connected to said exhaust pipe for significantly silencing noise generated by said exhaust vapor.

55. The system of claim 31 including generator means coupled to said internal combustion engine for generating electricity.

56. The system of claim 31 wherein said cooling means comprising a fan and cooling coils located within said system adjacent to an air input into said system.

57. The system of claim 56 wherein said cooling means further comprising fan, condenser and compressor means for providing a coolant fluid for said cooling coils.

58. The system of claim 57 including generator means coupled to said internal combustion engine for generating electricity.

59. The system of claim 58 further including feedback means coupled to said generator means for providing electrical energy to power electrical components of said cooling means.

60. A method of providing an energy efficient combined system including a vaporous fuel mixture energy source and an internal combustion engine comprising the steps of:

providing an internal combustion engine having a plurality of cylinders;

injecting a vaporous fuel mixture energy source into said internal combustion engine, said vaporous fuel mixture energy source comprising means for injecting a mixture of air and vaporous fuel into each one of said plurality of cylinders to provide a source of fuel for said each one of said plurality of cylinders; and using refrigeration means for cooling both said air and said vaporous fuel to a lower temperature to permit increased performance and efficiency of said internal combustion engine.

61. The method of claim 60 wherein said vaporous fuel being at least one of natural gas, propane, butane, methane and any vaporous fuel.

62. The method of claim 60 wherein said vaporous fuel mixture energy source consisting of air and natural gas.

63. The method of claim 60 wherein said vaporous fuel mixture energy source consisting of air and propane.

64. The method of claim 60 wherein said vaporous fuel mixture energy source consisting of air and butane.

65. The method of claim 60 wherein said injecting means comprising a plurality of tubes corresponding on a one for one basis with said plurality of cylinders.

66. The method of claim 65 including the step of providing means for injecting a mixture of air and vaporous fuel into each one of said plurality of tubes.

67. The method of claim 66 wherein said mixture of air and vaporous fuel having a ratio mixture in the range of about 10 to about 20 for air to about 1 for vaporous fuel.

68. The method of claim 65 wherein each one of said plurality of tubes having a length to diameter ratio in the range of about 8 to about 12 to about 1.

69. The method of claim 66 wherein each one of said plurality of tubes having a length to diameter ratio in the range of about 8 to about 12 to about 1.

70. The method of claim 67 wherein each one of said plurality of tubes having a length to diameter ratio in the range of about 8 to about 12 to about 1.

71. The method of claim 65 wherein said plurality of cylinders being eight cylinders and said plurality of tubes being eight tubes.

72. The method of claim 65 wherein said injecting means comprising at least one carburetor means for receiving air in one end thereof; vaporous fuel receiving means coupled to said carburetor means at another end thereof for receiving vaporous fuel for mixture with the air from said carburetor means, and plenum chamber means for coupling and delivering said mixture of air and vaporous fuel received from said vaporous fuel receiving means into each one of said plurality of tubes.

73. The method of claim 72 wherein said injecting means comprising two carburetor means for receiving air in one end of each one thereof said vaporous fuel receiving means being coupled to each one of said two carburetor means at said another end thereof, said plenum chamber means being coupled to an output of said vaporous fuel receiving means.

74. The method of claim 60 including the step of providing means for cooling said air prior to injection into each one of said plurality of cylinders.

75. The method of claim 60 including the step of providing means for cooling said vaporous fuel prior to injection into each one of said plurality of cylinders.

76. The method of claim 60 wherein said cooling means cooling said air and said vaporous fuel prior to injection into each one of said plurality of cylinders.

77. The method of claim 60 including the step of providing acceleration means for significantly accelerating said mixture of air and vaporous fuel into said each one of said plurality of cylinders.

78. The method of claim 77 wherein said acceleration means located within said each one of said plurality of cylinders for rapidly accelerating said mixture of air and vaporous fuel into said each of one of said plurality of cylinders.

79. The method of claim 62 wherein said air received by said carburetor means being substantially turbulent free and in a linear direction.

80. The method of claim 60 including the step of providing exhaust means connected to said internal combustion engine for exhausting exhaust vapor from said internal combustion engine.

81. The method of claim 80 wherein said exhaust means comprising a plurality of external exhaust conduits located on said internal combustion engine and at least one exhaust pipe connected to said plurality of external exhaust conduits.

82. The method of claim 81 wherein said exhaust pipe is located in a cooled region of said system to cool said exhaust vapor.

83. The method of claim 81 wherein said exhaust means comprising a pair of exhaust pipes with each one of said pair of exhaust pipes respectively connected to a separate plurality of exhaust conduits.

84. The method of claim 82 including the step of providing silencer means located in said cooled region of said system and connected to said exhaust pipe for significantly silencing noise generated by said exhaust vapor.

85. The method of claim 60 including the step of providing generator means coupled to said internal combustion engine for generating electricity.

86. The method of claim 74 wherein said cooling means comprising a fan and cooling coils located within said system adjacent to an air input into said system.

87. The method of claim 86 wherein said cooling means further comprising fan, condenser and compressor means for providing a coolant fluid for said cooling coils.

88. The method of claim 87 including the step of providing generator means coupled to said internal combustion engine for generating electricity.

89. The method of claim 88 further including the step of providing feedback means coupled to said generator means for providing electrical energy to power electrical components of said cooling means.

90. A method of providing an energy efficient combined system including a vaporous fuel mixture energy source and an internal combustion engine comprising, the steps of:

providing an internal combustion engine having a plurality of cylinders;

injecting a vaporous fuel mixture energy source comprising a mixture of air and vaporous fuel into said plurality of cylinders of said internal combustion engine; and providing cooling means including refrigeration means for cooling said air and said vaporous fuel to a lower temperature prior to mixture and entry into said plurality of cylinders of said internal combustion engine to permit increased performance and efficiency of said internal combustion engine.

* * * * *